US010793078B2

(12) United States Patent
Schuling et al.

(10) Patent No.: US 10,793,078 B2
(45) Date of Patent: Oct. 6, 2020

(54) STORAGE CONTAINERS AND METHODS OF SHIPPING

(71) Applicant: Dee Zee, Inc., Des Moines, IA (US)

(72) Inventors: Eric Schuling, Bondurant, IA (US); Mike Moyer, Ankeny, IA (US)

(73) Assignee: DEE ZEE, INC., Des Moines, IA (US)

( * ) Notice: Subject to any disclaimer, the term of this patent is extended or adjusted under 35 U.S.C. 154(b) by 334 days.

(21) Appl. No.: 15/332,200

(22) Filed: Oct. 24, 2016

(65) Prior Publication Data

US 2017/0121054 A1    May 4, 2017

Related U.S. Application Data

(60) Provisional application No. 62/248,668, filed on Oct. 30, 2015.

(51) Int. Cl.
*B60R 9/06* (2006.01)

(52) U.S. Cl.
CPC ..................... *B60R 9/065* (2013.01)

(58) Field of Classification Search
CPC ............ B60R 9/065; B60R 9/00; B60R 11/06
USPC ...................................................... 220/23.86
See application file for complete search history.

(56) References Cited

U.S. PATENT DOCUMENTS

| | | | | |
|---|---|---|---|---|
| 4,850,519 A | * | 7/1989 | Farmer, Jr. | ................ B60R 9/00 224/404 |
| 5,186,510 A | * | 2/1993 | Stapp | ....................... B60R 9/00 190/107 |
| 5,598,961 A | * | 2/1997 | Sills | .......................... B60R 9/00 224/404 |
| 6,056,177 A | * | 5/2000 | Schneider | ................. B60R 5/04 220/4.28 |
| 6,257,640 B1 | | 7/2001 | Leitner et al. | |
| 6,401,995 B1 | * | 6/2002 | Yuille | ....................... B60R 7/02 220/483 |
| 6,467,830 B1 | * | 10/2002 | Cortright | ................ B60R 13/06 296/26.04 |
| 6,471,278 B2 | | 10/2002 | Leitner et al. | |

(Continued)

FOREIGN PATENT DOCUMENTS

WO      2002034573 A1    5/2002

OTHER PUBLICATIONS

Notice on the First Office Action pertaining to Chinese Application No. 201611151883.1 filed Oct. 31, 2016.

(Continued)

*Primary Examiner* — Ernesto A Grano
(74) *Attorney, Agent, or Firm* — Dinsmore & Shohl LLP

(57) ABSTRACT

A storage container having a low volume profile shipping configuration is provided. The storage container includes a senior portion and a junior portion. The senior portion includes a wall defining a first internal cavity. The junior portion includes a plurality of junior wall sections configured to be assembled together to define a second cavity. The junior portion is configured to be coupled to the senior portion when the storage container is in an assembled configuration. The plurality of junior wall sections are configured to be disposed within the internal cavity of the senior portion in an unassembled configuration when the storage container is in the low volume profile shipping configuration, wherein the assembled configuration has a larger volume profile than the low volume profile shipping configuration.

20 Claims, 10 Drawing Sheets

(56) References Cited

U.S. PATENT DOCUMENTS

| | | | |
|---|---|---|---|
| 6,507,701 B2* | 1/2003 | Lake | B60R 9/00 |
| | | | 296/26.11 |
| 6,536,826 B1* | 3/2003 | Reed | B60P 3/42 |
| | | | 224/404 |
| 6,644,711 B2 | 11/2003 | Leitner et al. | |
| 6,824,184 B2 | 11/2004 | Leitner et al. | |
| 7,017,966 B2 | 3/2006 | Clonan | |
| 7,234,618 B2 | 6/2007 | Warganich | |
| 7,823,739 B2 | 11/2010 | Sadkin et al. | |
| 8,544,708 B2 | 10/2013 | Maimin | |
| 8,701,950 B2 | 4/2014 | Roach et al. | |
| 8,960,756 B2 | 2/2015 | Roach et al. | |
| 9,079,548 B1* | 7/2015 | Singer | B60R 11/06 |
| 9,089,964 B2 | 7/2015 | Cheng | |
| 9,132,785 B2 | 9/2015 | Roach et al. | |
| 9,132,786 B2 | 9/2015 | Roach et al. | |
| 9,156,412 B1* | 10/2015 | Calvert | B60P 7/08 |
| 9,193,307 B2 | 11/2015 | Roach et al. | |
| 9,650,085 B2* | 5/2017 | Wilson | B62D 33/0207 |
| 9,827,916 B1* | 11/2017 | Singer | B62D 33/023 |
| 9,849,839 B2* | 12/2017 | Buckland | B60R 11/06 |
| 2002/0175530 A1 | 11/2002 | Lake | |
| 2003/0098591 A1 | 5/2003 | Leitner et al. | |
| 2004/0169389 A1 | 9/2004 | Leitner et al. | |
| 2005/0225110 A1 | 10/2005 | Clonan | |
| 2006/0266778 A1 | 11/2006 | Allotey | |
| 2008/0185862 A1 | 8/2008 | Tarrant et al. | |
| 2008/0277402 A1 | 11/2008 | Lowrey | |
| 2010/0170873 A1 | 7/2010 | Lopez | |
| 2010/0264180 A1 | 10/2010 | Allotey | |
| 2013/0264338 A1 | 10/2013 | Dunstan | |
| 2014/0197168 A1 | 7/2014 | Miller et al. | |

OTHER PUBLICATIONS

Office Action pertaining to CN Application No. 201611151883.1 dated Jan. 3, 2020.

* cited by examiner

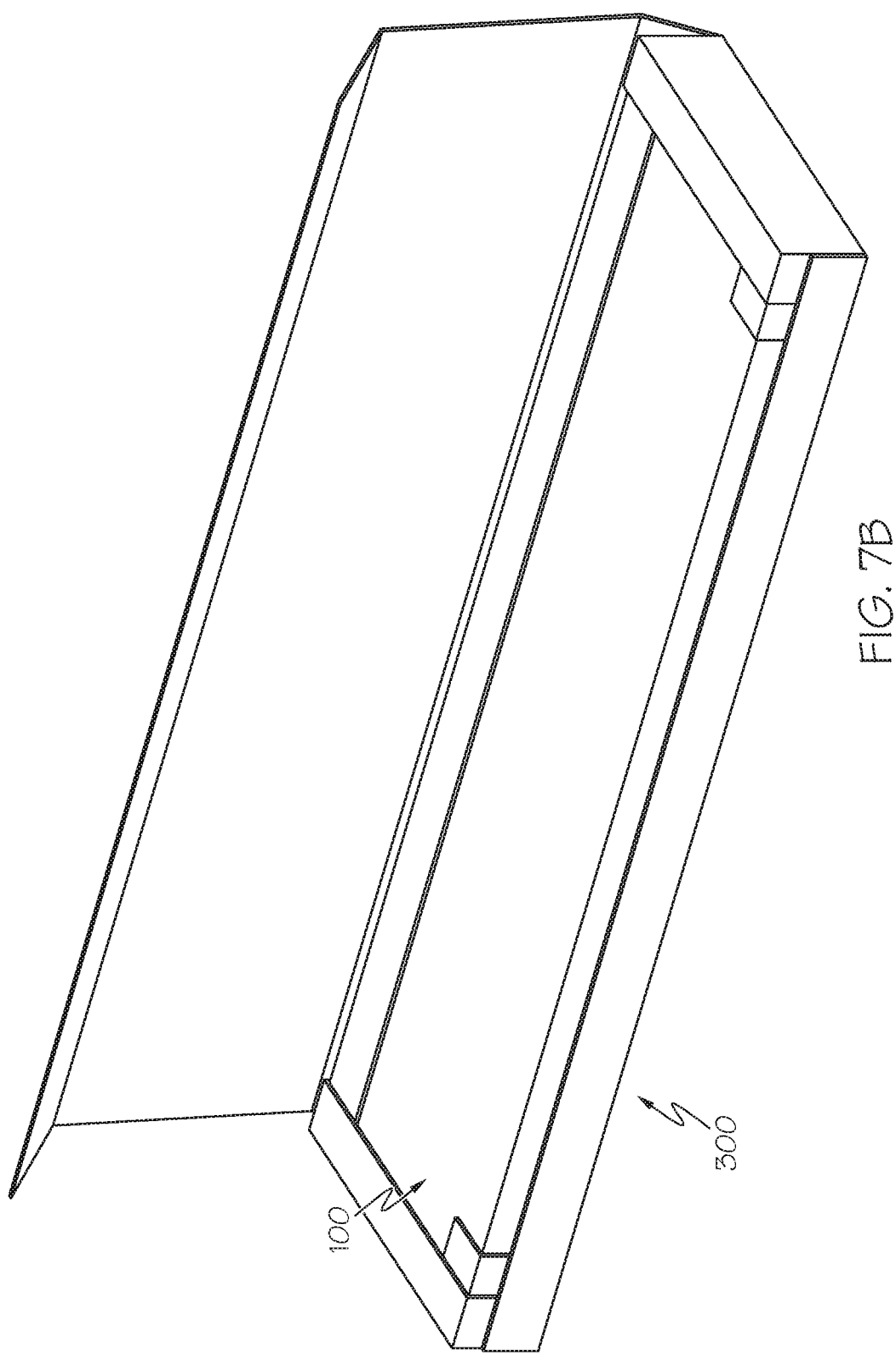

STORAGE CONTAINERS AND METHODS OF SHIPPING

CROSS-REFERENCE TO RELATED APPLICATIONS

This application claims the benefit of U.S. Provisional Application No. 62/248,668 filed Oct. 30, 2015, the entirety of which is hereby incorporated by reference.

TECHNICAL FIELD

The present specification generally relates to storage containers and methods for shipping the same and, more specifically, to vehicle storage containers having low volume profile shipping configurations for reducing shipping costs.

BACKGROUND

Storage containers come in all shapes and sizes. Some storage containers are designed specifically to be installed in a rear bed of a vehicle, namely a truck. Such storage containers are often assembled by a manufacturer at a plant and are then shipped to consumers or to retail locations. Often these storage containers are large and bulky such that they are expensive to ship. These costs may be passed on to the consumer or absorbed by the manufacturer. Further, keeping an inventory of such storage containers may be space prohibitive at certain retail locations such that a suitable supply may not be able to meet the demand. This may be especially true during events where storage containers are often given as gifts such as on Christmas or Father's Day.

Accordingly, a need exists for alternative storage container designs to reduce shipping costs while still allowing for relatively easy assembly later on and optimal storage capacity.

SUMMARY

In one embodiment, a storage container having a low volume profile shipping configuration is provided. The storage container includes a senior portion and a junior portion. The senior portion includes a wall defining an internal cavity. The junior portion includes a plurality of junior wall sections configured to be assembled together to define a second cavity. The junior portion is configured to be coupled to the senior portion when the storage container is in an assembled configuration. The plurality of junior wall sections are configured to be disposed within the internal cavity of the senior portion in an unassembled configuration when the storage container is in the low volume profile shipping configuration, wherein the assembled configuration has a larger volume profile than the low volume profile shipping configuration.

In another embodiment, a storage container having a low volume profile shipping configuration is provided. The storage container includes a senior portion and a junior portion. The senior portion includes a wall defining an internal cavity. The junior portion includes a plurality of junior wall sections configured to be assembled together to define a second cavity. The junior portion is configured to be coupled to the senior portion when the storage container is in an assembled configuration. The plurality of junior wall sections are configured to be within the internal cavity of the senior portion in an unassembled configuration when the storage container is in the low volume profile shipping configuration, wherein the assembled configuration has a larger volume profile than the low volume profile shipping configuration. The storage container is configured to be attached to a vehicle when in the assembled configuration.

In another embodiment, a method for packaging a storage container having a low volume profile shipping configuration for reduced shipping costs is provided. The method includes placing a senior portion of the storage container within a shipping container. The senior portion of the storage container includes a wall defining an internal cavity. The method further includes placing a junior portion of the storage container in an unassembled configuration into the internal cavity of the senior portion of the storage container. The junior portion includes a plurality of junior wall sections configured to be assembled together to define a second cavity. The junior portion is configured to be coupled to the senior portion when the storage container is in an assembled configuration, wherein the assembled configuration has a larger volume profile than the low volume profile shipping configuration. The method further includes preparing the shipping container to be placed with a carrier.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 7A-7C depict the method of FIG. 6, according to one or more embodiments shown and described herein.

DETAILED DESCRIPTION

The embodiments disclosed herein include storage containers having low volume profile shipping configurations and methods of shipping such storage containers. Storage containers having low volume profile shipping configurations according to at least some embodiments shown and described herein generally include at least a senior portion and a junior portion. As will be described in greater detail herein, when the storage container is in a low volume shipping configuration, the junior portion is disposed, in an unassembled state, within a first internal cavity of the senior portion. In this way, the overall volume of the storage container may be reduced for shipping purposes. The various embodiments will be described in more detail herein with specific reference to the corresponding drawings.

Figure 1:
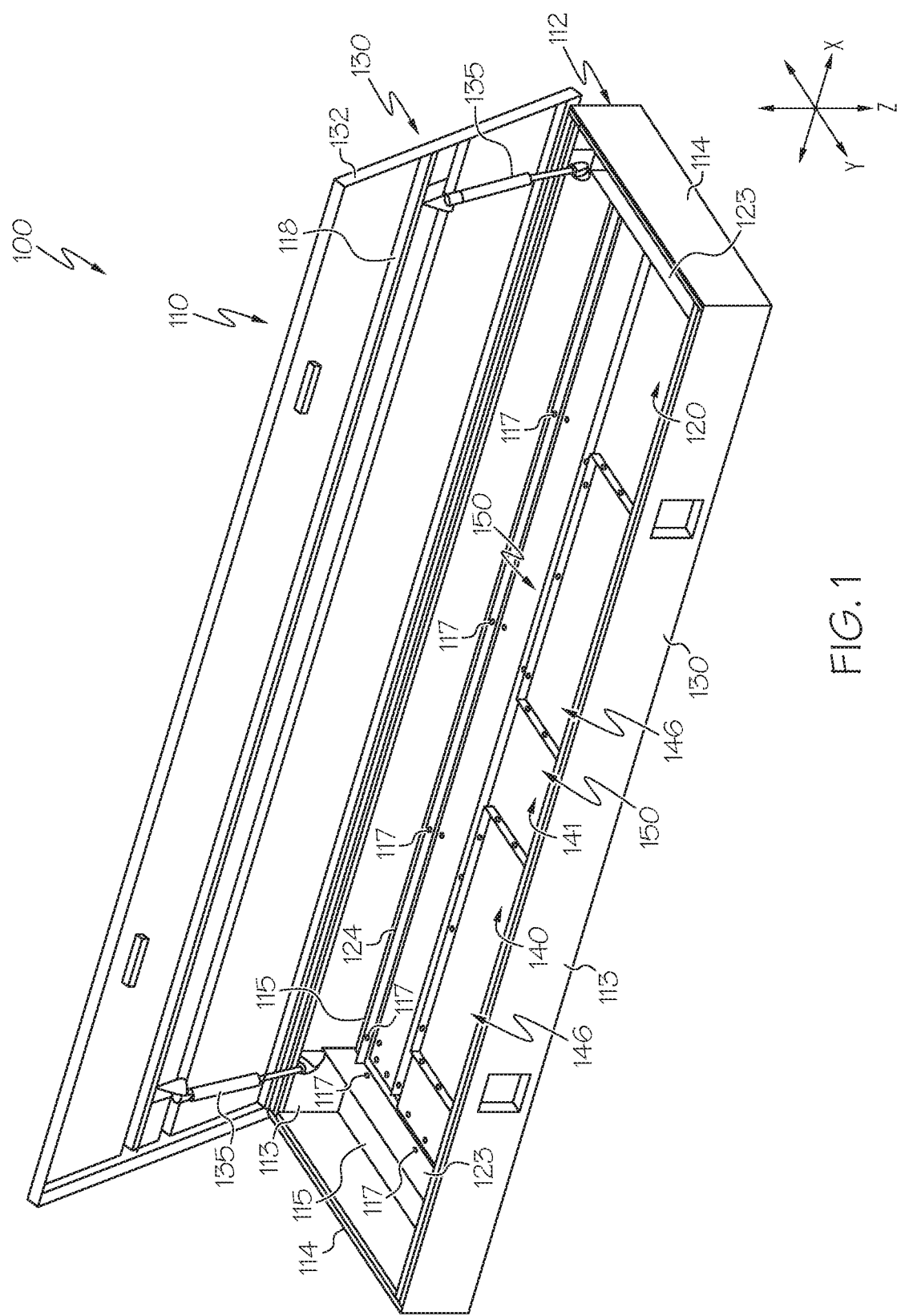
FIG. 1 depicts a perspective view of a storage container in a low volume profile shipping configuration, according to one or more embodiments shown and described herein.
Figure 4:
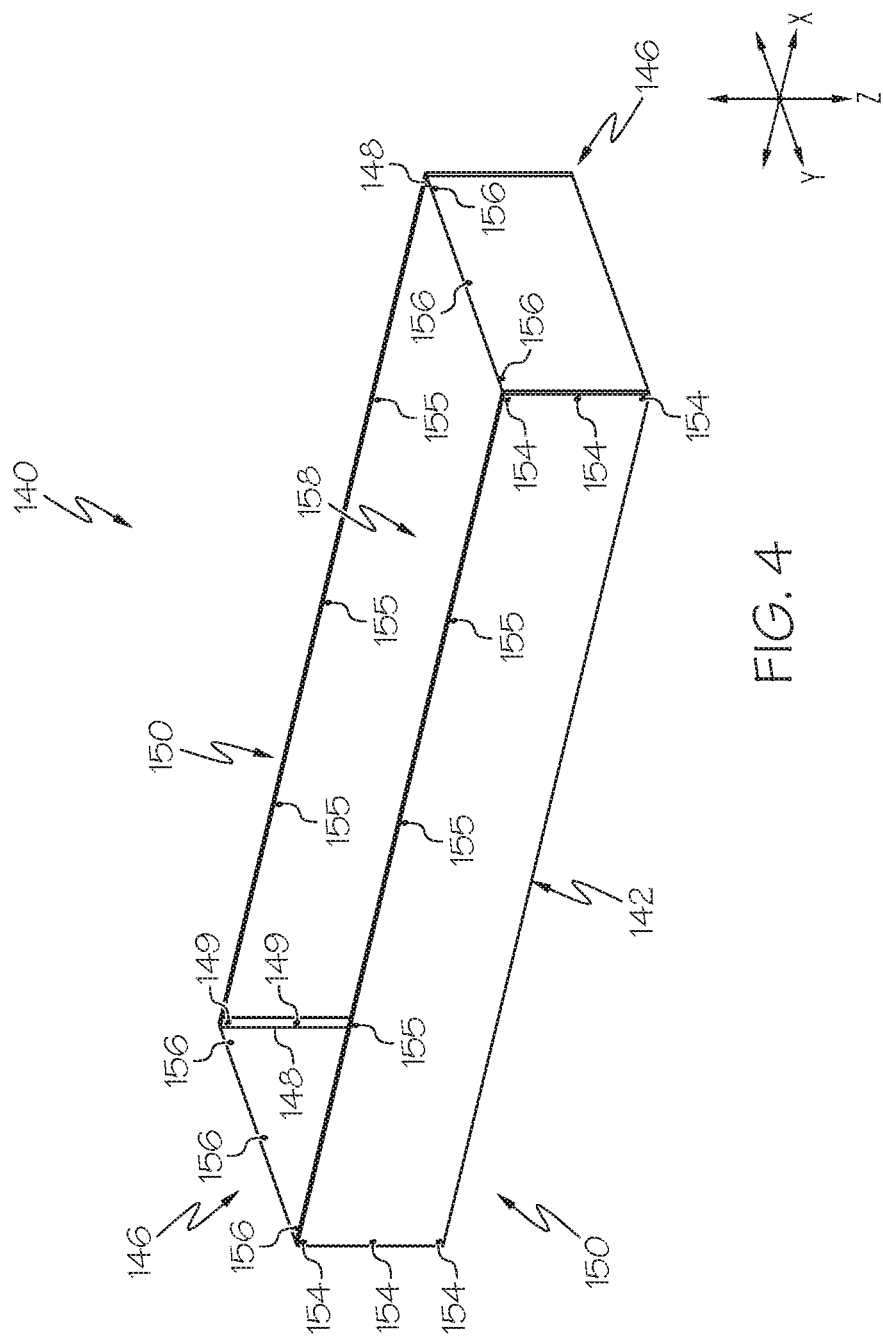
FIG. 4 depicts a perspective view of the junior portion of the storage container of FIG. 3 in an assembled configuration, according to one or more embodiments shown and described herein.

Referring to FIG. 1, FIG. 1 generally depicts one embodiment of a storage container 100 in a low volume profile shipping configuration such as may be used in preparation of shipping the storage container 100. The storage container 100 includes a senior portion 110 and a junior portion 140. In the low volume profile shipping configuration, the junior portion 140 comprises a plurality of unassembled junior wall sections 141, that when assembled, define a second cavity 158 (as shown in FIG. 4).

Figure 2:
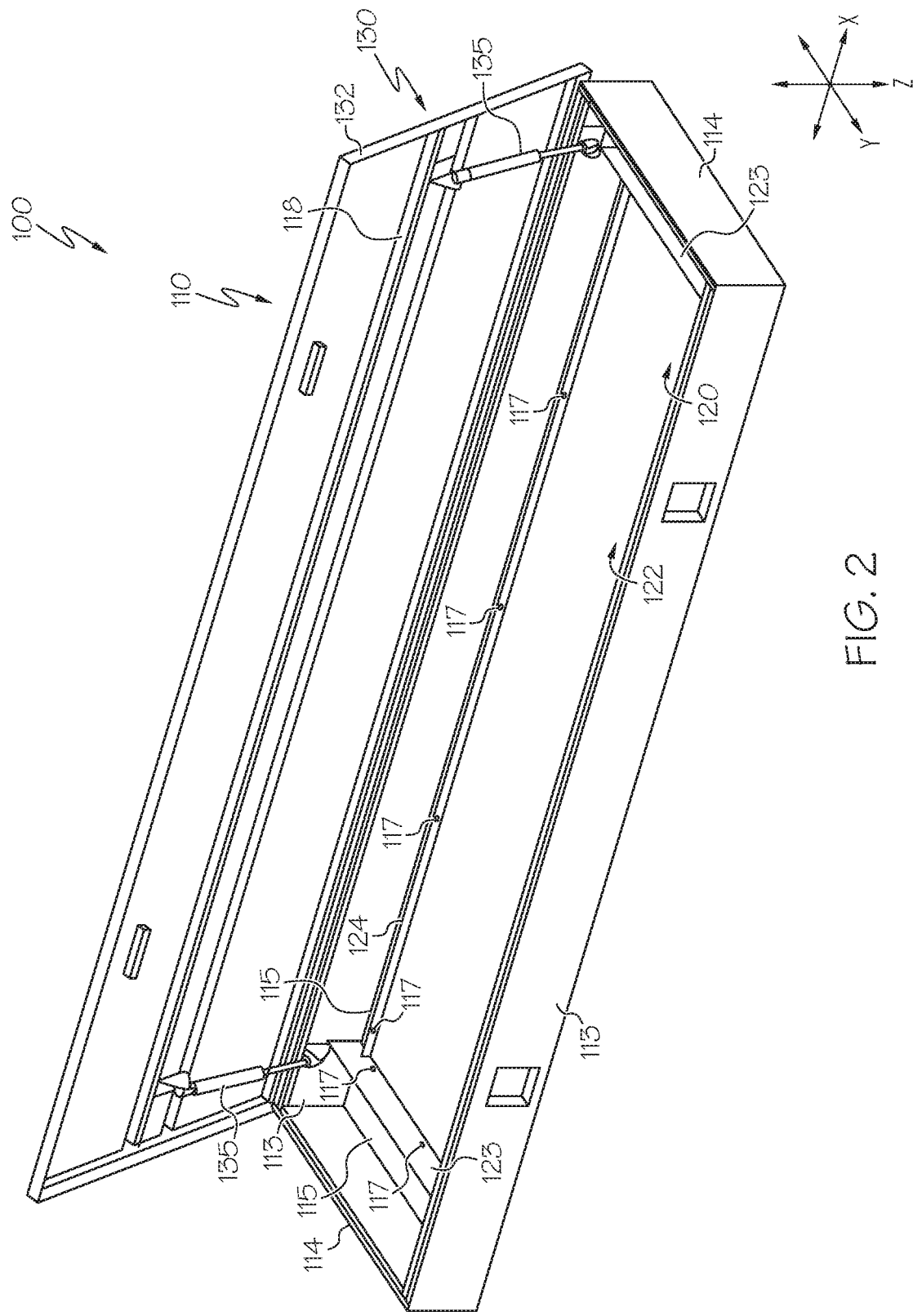
FIG. 2 depicts a perspective view of a senior portion of the storage container of FIG. 1, according to one or more embodiments shown and described herein.

Referring now to FIG. 2, the senior portion 110 is depicted in isolation from the junior portion 140. The senior portion 110 includes a wall 112. The wall 112 generally defines a first internal cavity 120. The wall 112 may include a pair of longitudinal senior wall sections 113 extending parallel to each other in a longitudinal direction, x, and a pair of lateral senior wall sections 114 extending parallel to each other in a lateral direction, y. In this exemplary embodiment, the wall 112 may have a generally rectangular configuration. However, it is contemplated that the senior portion 110 may be a variety of shapes and, in some configurations, could have additional walls. Furthermore, though the wall 112 is shown to generally include planar sections, it is contemplated that the wall 112 may have curved portions in some embodiments. The longitudinal senior wall sections 113 and lateral senior wall sections 114 may be fixed to one another through any suitable methods such as, but not limited to, welding or fastening.

Extending internally from the wall 112 is an internally projecting rim 115. The internally projecting rim 115 may extend internally around an entire internal perimeter of the wall 112 or, in some embodiments, only a portion of the wall 112. The internally projecting rim 115 may have a constant width. In the alternative, the width of the internally projecting rim 115 may be wider at the lateral senior wall sections 114 than at the longitudinal senior wall sections 113 or vice versa.

Extending substantially perpendicularly from the internally projecting rim 115, and spaced inwardly apart from the wall 112 are longitudinal senior flanges 124 and lateral senior flanges 123, wherein the longitudinal senior flanges 124 and lateral senior flanges 123 define a pass-through 122. The longitudinal senior flanges 124 may be substantially parallel to one another and extend along the respective senior longitudinal wall sections 113. Similarly, the lateral senior flanges 123 may be substantially parallel to one another and extend along the respective senior lateral wall sections 114. As such, in some embodiments the longitudinal senior flanges 124 and the lateral senior flanges may intersect with one another at a substantially perpendicular orientation. A height of the longitudinal senior flanges 124 may be substantially congruent to a height of the lateral senior flanges 123. In the alternative, the height of the longitudinal senior flanges 124 and the height of the lateral senior flanges 123 may be different. In some embodiments, the lateral senior flanges 123 may span a distance of separation between the longitudinal senior wall sections 113. In such embodiments, the longitudinal senior flanges 124 may terminate upon intersection with the lateral senior flanges 123. The longitudinal senior flanges 124 and lateral senior flanges 123 may further comprise a plurality of senior fastener receiving apertures 117.

Figure 5:
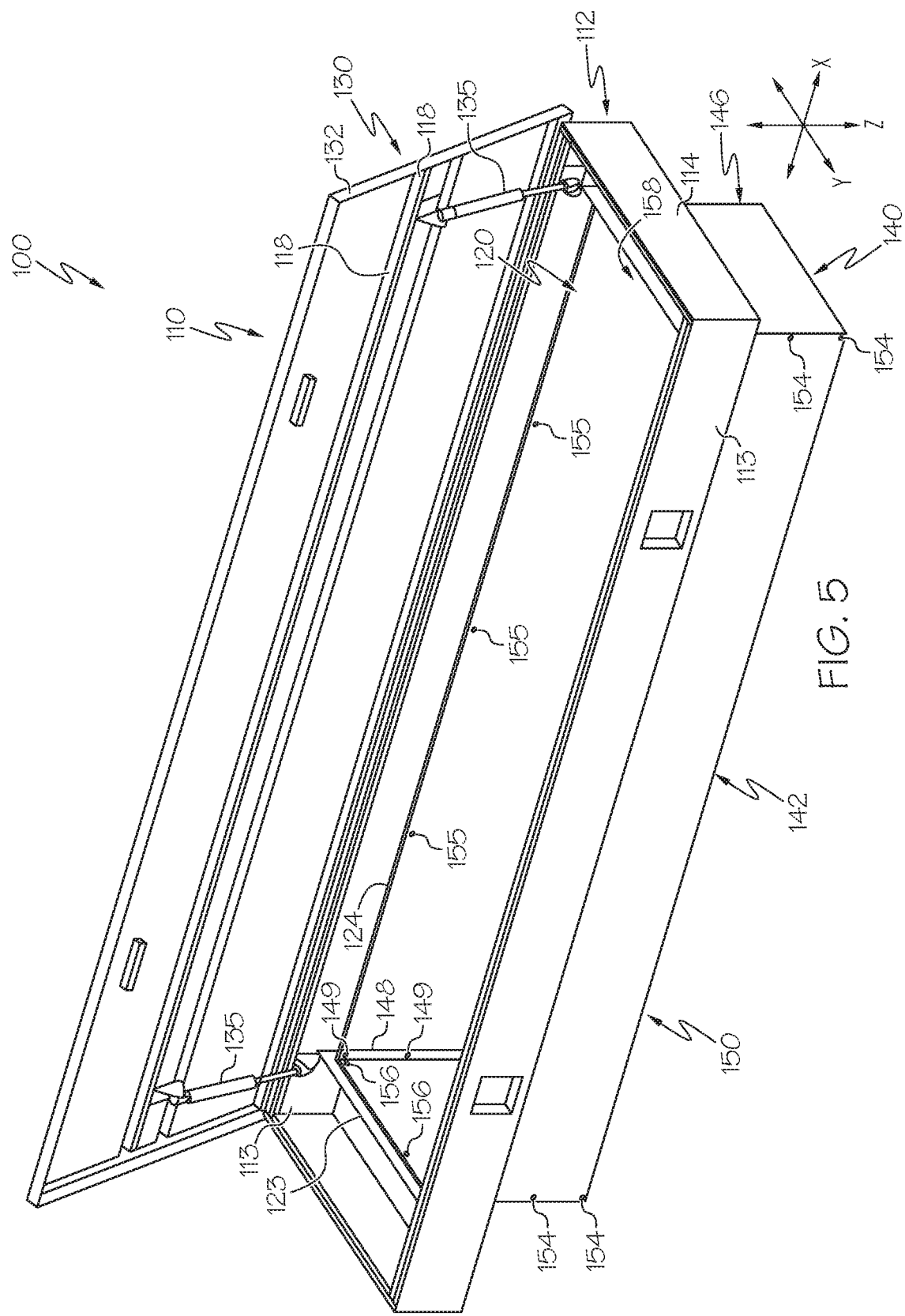
FIG. 5 depicts a perspective view of the storage container of FIG. 1 in an assembled configuration with a larger volume profile, according to one or more embodiments shown and described herein.

The senior fastener receiving apertures 117 may be configured to receive a fastener such as a bolt. The senior fastener receiving apertures 117 may be spaced around an interior perimeter of the senior portion 110 as defined by the longitudinal senior flanges 124 and lateral senior flanges 123. The longitudinal senior flanges 124 may have a greater number of senior fastener receiving apertures 117 than the lateral senior flanges 123. The respective longitudinal senior flanges 124 may have equal numbers of senior fastener receiving apertures 117. Similarly, the respective lateral senior flanges 123 may have an equal number of senior fastener receiving apertures 117. As will be described in greater detail herein, the senior fastener receiving apertures 117 may be used to couple an assembled junior portion 140 with the senior portion 110, as shown in FIG. 5.

Still referring to FIG. 2, the senior portion 110 of the storage container 100 also includes a lid 130. The lid 130 may be pivotably coupled to a side portion of the wall 112. The lid 130, when in a closed position (such as shown in FIG. 7B), encloses the first internal cavity 120 of the senior portion 110 of the storage container 100. The lid 130 may comprise an overhang 132 such that when the lid 130 is in a closed position, the overhang 132 extends along the wall 112 such that a top of the wall 112 is enclosed within the lid 130 and covered by the overhang 132. The overhang 132 of the lid 130 may comprise a seal (not shown) to inhibit entry of environmental contaminants such as rain, snow, or dust into the storage container 100. The seal may be made out of any suitable rubber materials. In some embodiments the seal may be made out of automotive grade rubber. The lid 130 may further comprise internal bends 118. The internal bends 118 may add superior strength and rigidity to the lid 130.

The storage container 100 may also comprise a shock absorber 135. The shock absorber 135 may be pivotably coupled to the lid 130 and the wall 112. The shock absorber 135 may allow the lid 130 to be more easily lifted and may hold the lid 130 in an open position. For example, the shock absorber 135 may hold the lid 130 in an open position up to about 90 degrees. An example of an appropriate shock absorber 135 may be dampened gas shocks. In some embodiments, there may be a multitude of shock absorbers 135. In embodiments where there are two shock absorbers 135, the shock absorbers 135 may be spaced apart from one another such that a shock absorber 135 engages the lid 130 in positions adjacent to the overhang 132 of the lid 130.

Figure 3:
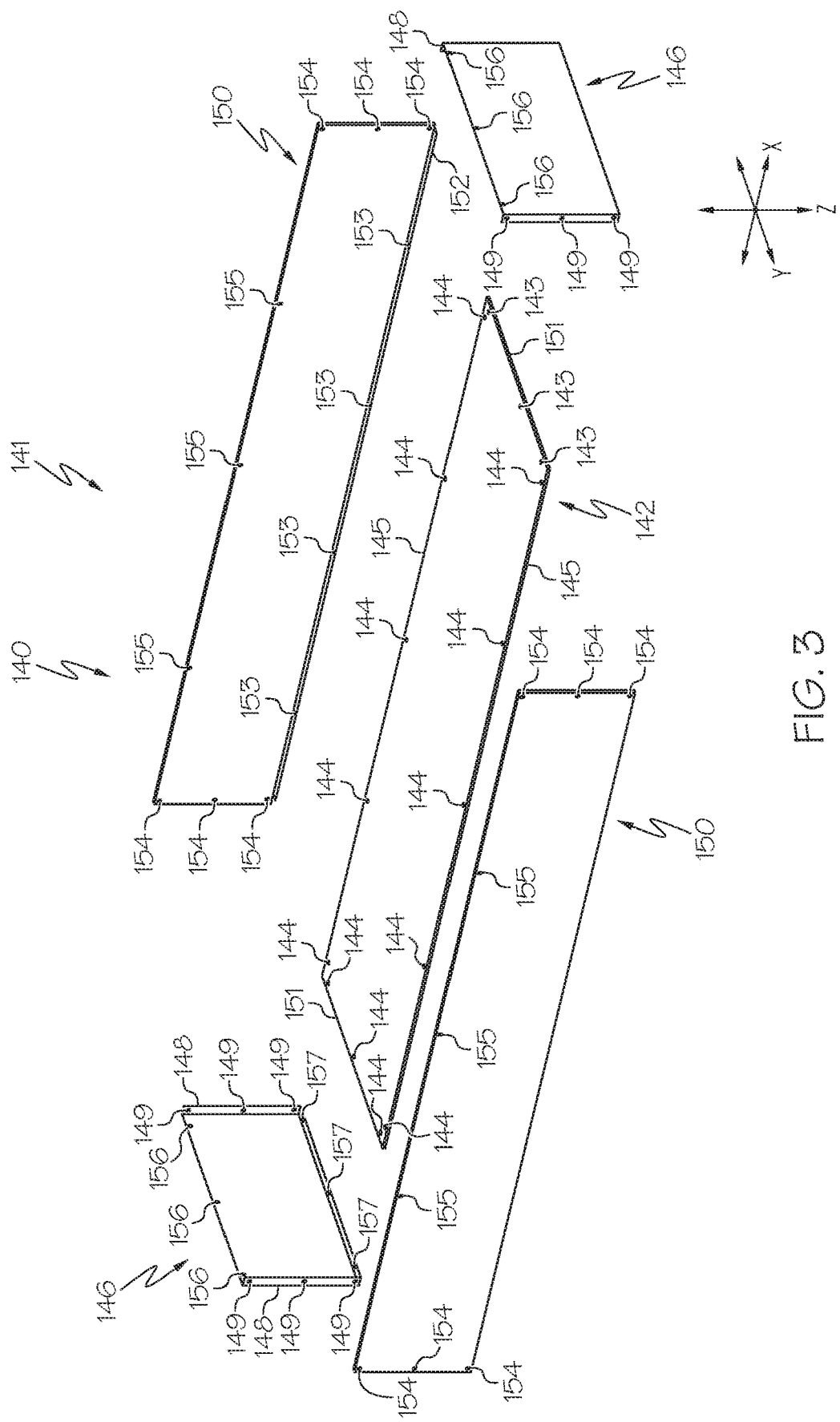
FIG. 3 depicts an exploded view of a junior portion of the storage container of FIG. 1, according to one or more embodiments shown and described herein.

Referring now to FIG. 3, the junior portion 140 of the storage container 100 comprises a plurality of junior wall sections 141 and is depicted in an unassembled configuration. As used herein, the term "unassembled configuration" generally refers to a configuration of the junior portion 140, wherein at least two of the junior wall sections 141 of the plurality of junior wall sections 141 are not constrained relative to one another. The plurality of junior wall sections 141 may be substantially planar and include at least a base wall section 142, first and second lateral junior wall sections 146, and first and second longitudinal junior wall sections 150. The number of junior wall sections 141 may generally coincide with the end shape of the assembled junior portion 140. For instance, in one embodiment, the plurality of junior wall sections 141 may comprise five junior wall sections 141 such that an open box may be formed when the plurality of junior wall sections 141 are assembled (as shown in FIG. 4). However, it is contemplated that the junior portion 140 of the storage container 100 may have any shape suitable for a storage container 100. Further, it is contemplated that in some embodiments, some or all of the plurality of junior wall sections 141 may be curved depending on the desired shape of the storage container 100. The plurality of junior wall sections 141 may be made of the same material as the senior portion 110 of the storage container 100. For example, the storage container 100 may be made out of steel, such as 20-Gauge steel, aluminum, or a combination thereof. In some embodiments, the storage container 100 may be made out of non-rusting 0.072 Brite-Tread Aluminum. In further embodiments, the material of the storage container 100 may be powder coated to change a color of the storage container 100.

Referring now to the base wall section 142 in particular, the base wall section 142 defines a base of the junior portion 140, when the junior portion is in an assembled configuration, such as shown in FIG. 4. Still referring to FIG. 3, the base wall section 142 may comprise base wall lateral apertures 143 and base wall longitudinal apertures 144. The base wall lateral apertures 143 and the base wall longitudinal apertures 144 are configured to receive a fastener therethrough. The base wall section 142 may be dimensioned such that the base wall section 142 may fit within the pass-through 122 defined by the longitudinal senior flanges 124 and lateral senior flanges 123 (shown in FIG. 2).

The first and second longitudinal junior wall sections 150 may have a base wall longitudinal interface 152. The base wall longitudinal interface 152 may extend substantially perpendicularly from the first and second longitudinal junior wall sections 150. When assembled, the base wall longitudinal interface 152 supports a longitudinal edge 145 of the base wall section 142. The base wall longitudinal interface 152 may include longitudinal fixing apertures 153. When the first and second longitudinal junior wall sections 150 are assembled to the base wall section 142, the longitudinal fixing apertures 153 of the base wall longitudinal interface 152 are substantially aligned with the base wall longitudinal apertures 144 of the base wall section 142. Fasteners may then be passed through both the base wall longitudinal apertures 144 of the base wall section 142 and the longitudinal fixing aperture 153 such the base wall section 142 and the first and second longitudinal junior wall sections 150 are fixed together (as shown in FIG. 4).

As will be described in more detail herein, the first and second longitudinal junior wall sections 150 may further comprise vertical aligning apertures 154 and senior longitudinal aligning apertures 155. The term vertical is not limited to traditional notions of up or down but instead refers to the directions indicated by the z-axis. The vertical aligning apertures 154 may aid in coupling the longitudinal junior wall sections 150 and the lateral junior wall sections 146. The senior longitudinal aligning apertures 155 may aid in coupling the longitudinal junior wall sections 150 with the longitudinal senior flanges 124 of the senior portion 110 of the storage container 100.

Still referring to FIG. 3, the first and second lateral junior wall sections 146 may comprise a base wall section lateral interface 147. The base wall lateral interface 147 may extend substantially perpendicularly from the first and second lateral junior wall sections 146. When assembled, the base wall lateral interface 147 supports a lateral edge 151 of the base wall section 142. The base wall lateral interface 147 may include lateral fixing apertures 157. When the first and second lateral junior wall sections 146 are assembled to the base wall section 142, the lateral fixing apertures 157 of the base wall lateral interface 147 are substantially aligned with the base wall lateral apertures 143 of the base wall section 142. Fasteners may be passed through both the base wall lateral apertures 143 of the base wall section 142 and the lateral fixing apertures 157 of the first and second lateral junior wall section 146 such that the base wall section 142 and the first and second longitudinal junior wall sections 150 are fixed together (as shown in FIG. 4).

The first and second lateral junior wall sections 146 may also comprise side locking flanges 148. The side locking flanges 148 may extend substantially perpendicularly from the first and second lateral junior wall sections 146. The side locking flanges 148 are configured to coincide with the first and second longitudinal junior wall sections 150, when the junior portion 140 is in an assembled configuration (as shown in FIG. 4). It is noted that the side locking flanges 148 could instead, extend substantially perpendicularly from the first and second longitudinal junior wall sections 150 such that the side locking flanges 148 are configured to coincide with the first and second lateral junior wall sections 146 when the junior portion 140 is in an assembled configuration. The side locking flanges 148 may comprise a plurality of side locking apertures 149.

The first and second lateral junior wall sections 146 may also comprise senior lateral aligning apertures 155. As will be described in greater detail herein, the senior aligning apertures 146 may aid in coupling the lateral junior wall sections 146 with the lateral senior flanges 124 of the senior portion 1110 of the storage container 100.

Referring also to FIG. 4, when the junior portion is in an assembled configuration, the side locking apertures 149 of the first and second lateral junior wall sections 146 substantially align with the vertical aligning apertures 154 of the first and second longitudinal junior wall sections 150. A fastener may then be passed through both the side locking apertures 149 of the first and second lateral junior wall sections 146 and the vertical aligning apertures 154 of the first and second longitudinal junior wall sections 150 to couple the first and second lateral junior wall sections 146 with the first and second longitudinal junior wall section 150 when the junior portion is in an assembled configuration.

In view of the above, the assembly of the storage container from the low volume profile shipping configuration (as shown in FIG. 1) to the larger volume profile assembled configuration (shown in FIG. 5) will be described. As such, to assemble the storage container 100 into a larger volume profile assembled configuration from the low volume profile shipping configuration, the lid 130 of the senior portion 110 of the storage container 100 may be lifted to an open position as shown in FIG. 1. The plurality of junior wall sections 141 of the junior portion 140 is disposed, in an unassembled configuration, within the first internal cavity 120 of the senior portion 110. The senior portion 110 of the storage container 100, therefore, may already be assembled such that only the junior portion 140 need be assembled and then attached to the senior portion 110.

In no particular order, the base wall section 142, the first and second longitudinal junior wall sections 150, and the first and second lateral junior wall sections 146 may be assembled by, as described herein, aligning the corresponding apertures. For instance, referring to FIG. 4, the first and second lateral junior wall sections 146 may be fixed to the first and second longitudinal junior wall sections 150, such that the first and second longitudinal junior wall sections 150 are substantially parallel to each other while being substantially perpendicular to the first and second lateral junior wall sections 146. In this configuration, the first and second lateral junior wall sections 146 may be substantially parallel to each other. To couple the first and second lateral junior wall sections 146 to the first and second longitudinal junior wall sections 150, the vertical aligning apertures 154 of the first and second longitudinal junior wall sections 150 may be aligned with the respective side locking apertures 149 of the side locking flanges 148 of the first and second lateral junior wall sections 146. A fastener, such as a bolt may be passed through the aligned apertures to rigidly hold the first and second lateral junior wall sections 146 to the first and second longitudinal junior wall sections 150.

As described herein, to attach the base wall section 142 to the now assembled first and second longitudinal wall sections 150 and first and second lateral junior wall sections 146. The base wall lateral apertures 143 of the base wall section 142 may be substantially aligned with the lateral fixing apertures 157 of the base edge interface 147 of the first and second lateral junior wall sections 146. A fastener, such as a bolt may be passed through the now aligned apertures to rigidly fix the base wall section 142 to the first and second lateral junior wall sections 146. Similarly, the base wall longitudinal apertures 144 of the base wall section 142 may be substantially aligned with the longitudinal fixing apertures 153 of the base wall longitudinal interface 152 of the first and second longitudinal junior wall sections 150. A fastener, such as a bolt, may then be passed through the now aligned apertures to rigidly fix the base wall section 142 to the first and second longitudinal junior wall sections 150. The now assembled junior portion 140, as shown in FIG. 4, defines a second cavity 158.

Referring now to FIG. 5, the junior portion is shown assembled to the senior portion 110. Referring to FIG. 5, the junior portion 140 may be assembled to the senior portion 110 by aligning the assembled lower portion within the pass-through 122 defined by the longitudinal senior flanges 124 and lateral senior flanges 123 of the senior portion 110. The senior lateral aligning apertures 156 of the first and second lateral junior wall sections 146 may be substantially aligned with the senior fastener receiving apertures 117 of the lateral senior flanges 123 of the senior portion 110. Further, the senior longitudinal aligning apertures 155 of the first and second longitudinal junior wall sections 150 may be substantially aligned with the senior fastener receiving apertures 117 of the longitudinal senior flanges 124 of the senior portion 110. Fasteners, such as, but not limited to, bolts, may then be passed through the now aligned apertures to rigidly fix the junior portion 140 to the senior portion 110. In this way the first internal cavity 120 of the senior portion 110 is opened to the second cavity 158 defined by the assembled junior portion 140.

Figure 6:
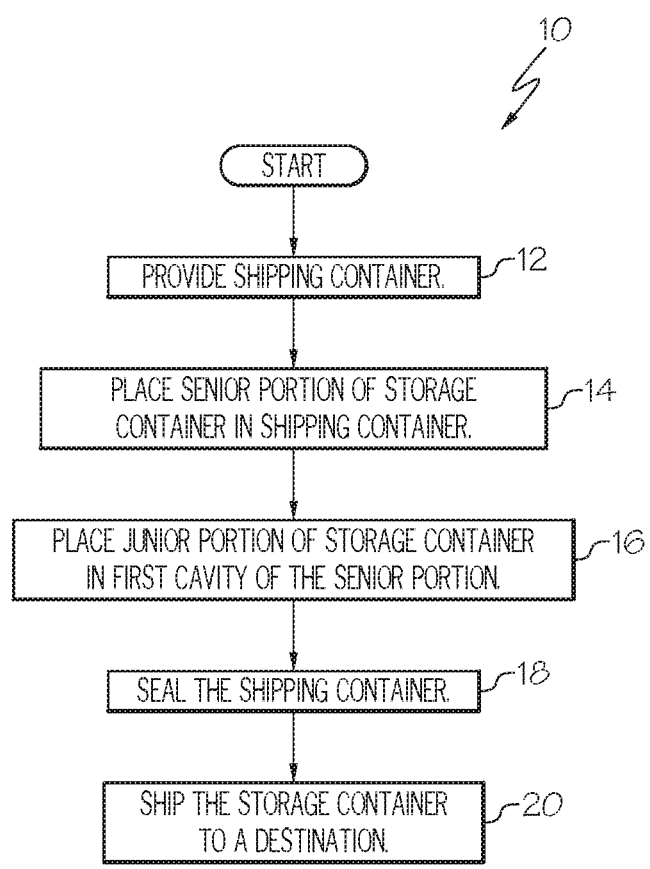
FIG. 6 depicts a method of shipping the storage container of FIG. 1, according to one or more embodiments shown and described herein.

Referring to FIG. 6, a method 10 for packaging the storage container 100 having a low volume profile shipping configuration for reduced shipping costs is also provided. Referring collectively to FIGS. 6-7C, to package a storage container 100 having a low volume profile shipping configuration, as described herein, a shipping container 300 configured to receive the storage container 100 is provided (block 12). The shipping container 300 may be a container capable of being prepared and shipped to a destination. For example, and not as a limitation, a cardboard box may be a suitable shipping container 300.

Figure 7A:
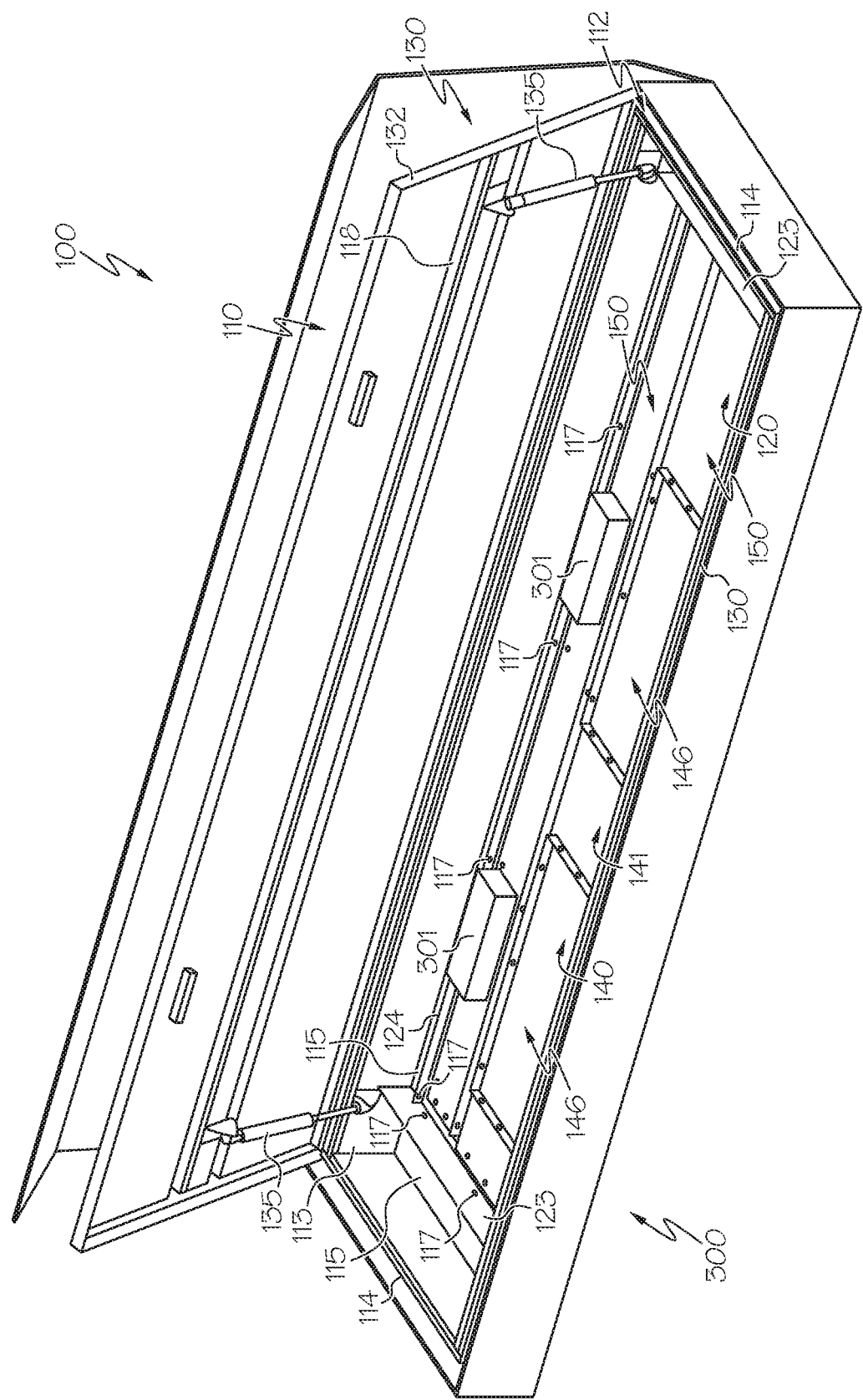
Figure 7C:
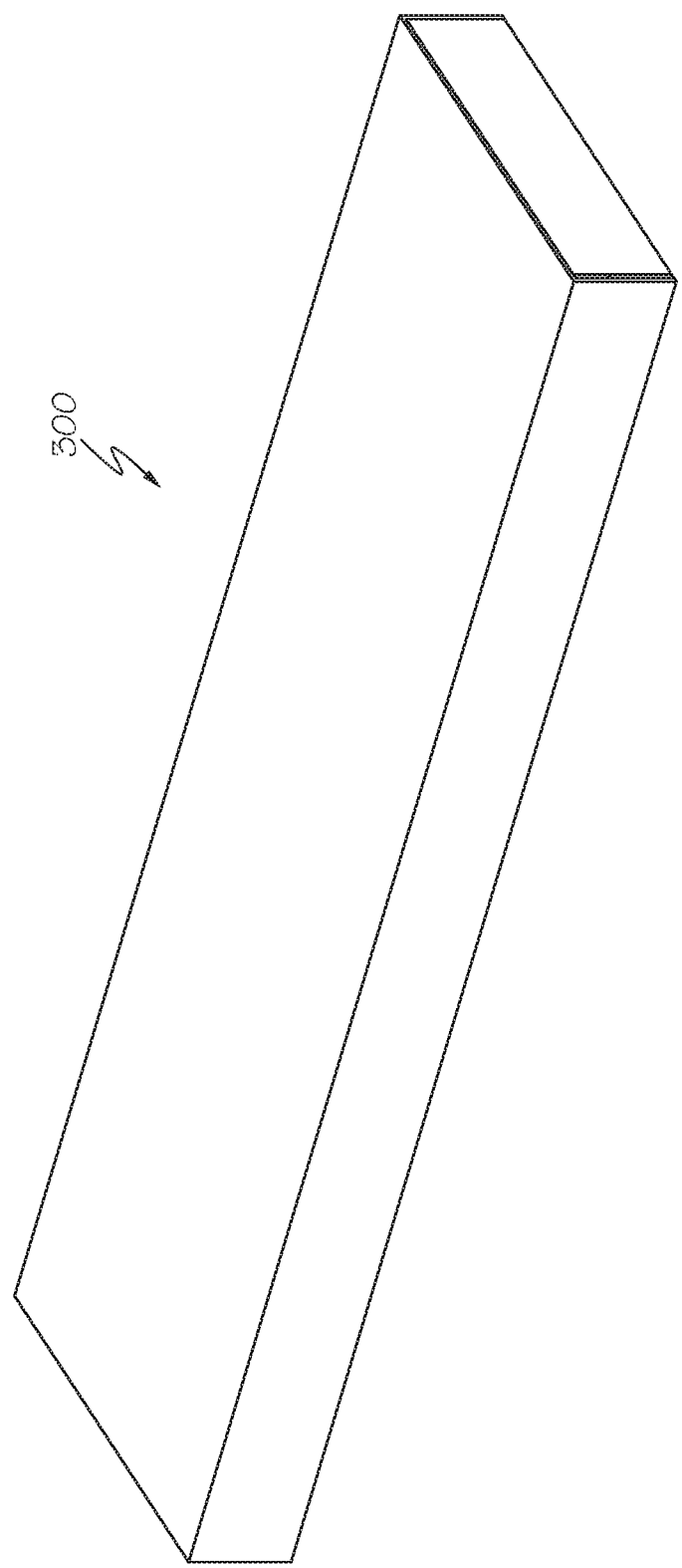

Referring to specifically to FIGS. 6 and 7A, the senior portion 110 of the storage container 100 may be placed within the shipping container 300 (block 14). The unassembled junior portion 140 may then be placed within the first internal cavity 120 the senior portion 110 (block 16). There may be a variety of configurations in which to pack the plurality of junior wall sections 141 of the junior portion 140 within first internal cavity 120 of the senior portion 110. In one embodiment, the base wall section 142 may be placed first within the pass-through 122 defined by the longitudinal senior flanges 124 and lateral senior flanges 123 of the senior portion 110. Next the first and second longitudinal junior wall sections 150 may be layered on top of the base wall section 142 within the first internal cavity 120 of the senior portion 110. Finally, the first and second lateral junior wall sections 146 may be placed within the first internal cavity 120 of the senior portion 110 on top of at least one of the first and second longitudinal junior wall sections 150. In some embodiments, the layers of junior wall sections 141 may be separated from one another by additional packing material, such as foam or cardboard, to protect the plurality of junior wall sections 141 from engaging one another during shipping and possibly damaging one another. Further, in some embodiments, foam or cardboard blocks 301 may be disposed within first internal cavity 120 of the senior portion 110 such that when the lid 130 of the senior portion 110 is in a closed position, the foam or cardboard blocks 301 provide extra support to the structure of the lid 130 during shipping. In some embodiments, the method may further include, packaging a plurality of fasteners to be used in the assembly of the storage container 100 within at least one of the storage container 100 or the shipping container 300.

Referring now to FIGS. 6 and 7B-7C, once the plurality of junior wall sections 141, including any additional materials (e.g., fasteners and packing materials), are placed within the first internal cavity 120 of the senior portion 110, the lid 130 of the senior portion 110 may be moved to a closed position (FIG. 7B). The shipping container 300 may then be sealed around the around the storage container (block 18, FIG. 7C). The storage container 100 may then be shipped, within the shipping container 300, to a destination (block 20). The packaged storage container 100 having a low volume profile shipping configuration may be shipped individually or within a lot such that multiple packaged storage containers are shipped together.

Figure 8:
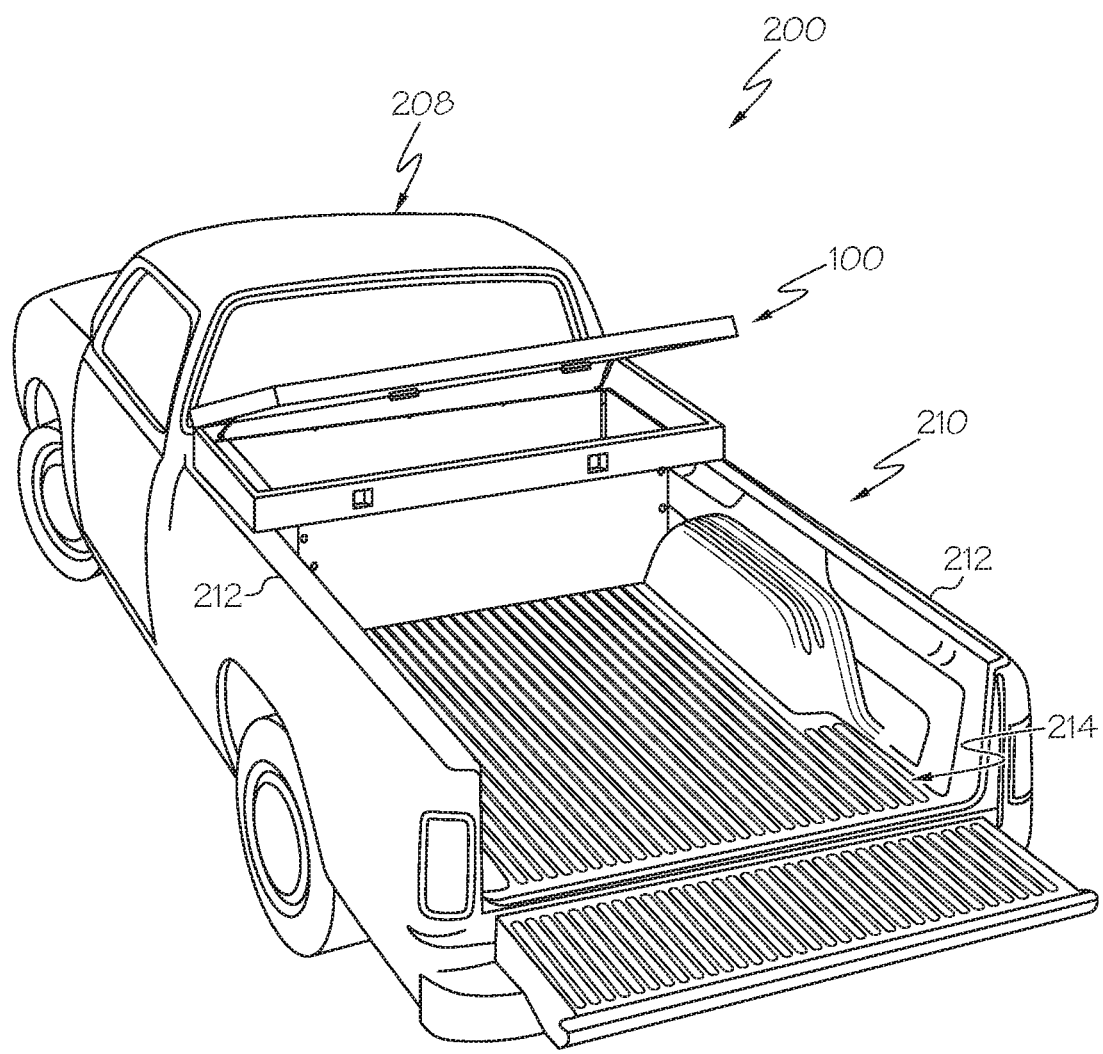
FIG. 8 depicts a perspective view of the storage container of FIG. 3 in the assembled configuration with a larger volume profile disposed within the rear bed of a truck, according to one or more embodiments shown and described herein.

It is noted that storage containers according to the present disclosure may be useful in a variety of environments. Referring to FIG. 8, in some embodiments, the storage container 100 may be suitable for attachment to a truck 200 or similar vehicles. For example, the truck 200 has a bed 210 with first and second side rails 212 spaced apart from one another. The bed 210 of the truck 200 extends from a cabin 205 of the truck 200 and has a floor 214. The storage container 100 as described herein may be fixed to the side rails 212 of the truck 200 once the storage container 100 has been assembled into the larger volume profile assembled configuration from the low volume profile shipping configuration. In the alternative, the storage container 100 could be configured such that it is fixed to only one side rail 212 of the truck 200.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A storage container having a low volume profile shipping configuration comprising:
 a senior portion comprising a wall defining a first internal cavity and an internally projecting rim extending internally from the wall and having an inner perimeter defining a pass-through opening; and
 a junior portion comprising a plurality of unassembled junior wall sections configured to be assembled together to define an outermost perimeter and a second cavity, wherein:
  the junior portion is configured to be coupled to the senior portion such that the outermost perimeter of the junior portion is arranged entirely within the inner perimeter of the pass-through opening of the senior portion in both lateral and longitudinal directions when the storage container is in an assembled configuration; and
  the plurality of unassembled junior wall sections are sized and configured to be arranged entirely within the inner perimeter of the pass-through opening of the senior portion in an unassembled configuration in both lateral and longitudinal directions when the storage container is in the low volume profile shipping configuration, wherein the assembled configuration has a larger volume profile than the low volume profile shipping configuration.

2. The storage container of claim 1, wherein the wall of the senior portion comprises:
 a longitudinal senior wall section;
 a longitudinal senior flange spaced internally apart from the longitudinal senior wall section and extending along the longitudinal senior wall section,
 a lateral senior wall section;
 a lateral senior flange spaced internally apart from the lateral senior wall section and extending along the lateral senior wall section, wherein the longitudinal senior flange and the lateral senior flange define the pass-through opening.

3. The storage container of claim 2, wherein the junior portion is configured to be coupled to the longitudinal senior flange and the lateral senior flange when the storage container is in the assembled configuration.

4. The storage container of claim 1, wherein the junior portion comprises:
 a base wall section;
 first and second longitudinal junior wall sections; and
 first and second lateral junior wall sections.

5. The storage container of claim 4, wherein the first and second longitudinal junior wall sections each comprise a base wall longitudinal interface, wherein the base wall longitudinal interface is configured to receive and support the base wall section when the storage container is in the assembled configuration.

6. The storage container of claim 4, wherein the first and second lateral junior wall sections each comprise a base edge interface, wherein the base edge interface is configured to receive and support the base wall section when the storage container is in the assembled configuration.

7. The storage container of claim 4, wherein the first and second lateral junior wall sections comprise side locking flanges configured to coincide with the first and second longitudinal junior wall sections.

8. A storage container having a low volume profile shipping configuration comprising:
 a senior portion comprising a wall defining a first internal cavity and an internally projecting rim extending internally from the wall and having an inner perimeter defining a pass-through opening; and
 a junior portion comprising a plurality of unassembled junior wall sections configured to be assembled together to define an outermost perimeter and a second cavity, wherein:
  the junior portion is configured to be coupled to the senior portion such that the outermost perimeter of the junior portion is arranged entirely within the inner perimeter of the pass-through opening of the senior portion in both lateral and longitudinal directions when the storage container is in an assembled configuration;
  the junior portion is sized and configured to be arranged entirely within the inner perimeter of the pass-through opening of the senior portion in an unassembled configuration in both lateral and longitudinal directions when the storage container is in the low volume profile shipping configuration; and
  the storage container is configured to be attached to a vehicle when in the assembled configuration, wherein the assembled configuration has a larger volume profile than the low volume profile shipping configuration.

9. The storage container of claim 8, wherein the wall of the senior portion comprises:
 a longitudinal senior wall section;
 a longitudinal senior flange spaced internally apart from the longitudinal senior wall section and extending along the longitudinal senior wall section,
 a lateral senior wall section;
 a lateral senior flange spaced internally apart from the lateral senior wall section and extending along the lateral senior wall section, wherein the longitudinal senior flange and the lateral senior flange define the pass-through opening.

10. The storage container of claim 9, wherein the junior portion is configured to be coupled to the longitudinal senior flange and the lateral senior flange when the storage container is in the assembled configuration.

11. The storage container of claim 8, wherein the junior portion comprises:
 a base wall section;
 first and second longitudinal junior wall sections; and
 first and second lateral junior wall sections.

12. The storage container of claim 11, wherein the first and second longitudinal junior wall sections each comprise a base wall longitudinal interface, wherein the base wall longitudinal interface is configured to receive and support the base wall section when the storage container is in the assembled configuration.

13. The storage container of claim 11, wherein the first and second lateral junior wall sections each comprise a base edge interface, wherein the base edge interface is configured to receive and support the base wall section when the storage container is in the assembled configuration.

14. The storage container of claim 11, wherein the first and second lateral junior wall sections comprise side locking flanges configured to coincide with the first and second longitudinal junior wall sections.

15. A method for packaging a storage container having a low volume profile shipping configuration comprising:

placing a senior portion of the storage container within a shipping container, the senior portion comprising of the storage container comprising a wall defining a first internal cavity and an internally projecting rim extending internally from the wall and having an inner perimeter defining a pass-through opening;

placing a junior portion of the storage container in an unassembled configuration within the pass-through opening of the senior portion of the storage container, wherein the junior portion is sized and configured to be arranged entirely within the inner perimeter of the pass-through opening of the senior portion in the unassembled configuration in both lateral and longitudinal directions, the junior portion of the storage container comprising a plurality of unassembled junior wall sections configured to be assembled together to define an outermost perimeter and a second cavity, wherein the plurality of junior wall sections are configured to be coupled to the senior portion such that the outermost perimeter of the junior portion is arranged entirely within the inner perimeter of the pass-through opening of the senior portion in both lateral and longitudinal directions when the storage container is in an assembled configuration, wherein the assembled configuration has a larger volume profile than the low volume profile shipping configuration; and sealing the shipping container.

16. The method of claim 15, wherein the wall of the senior portion comprises:

a longitudinal senior wall section;

a longitudinal senior flange spaced internally apart from the longitudinal senior wall section and extending along the longitudinal senior wall section, a lateral senior wall section;

a lateral senior flange spaced internally apart from the lateral senior wall section and extending along the lateral senior wall section, wherein the longitudinal senior flange and the lateral senior flange define the pass-through opening.

17. The method of claim 16, wherein the junior portion is configured to be coupled to the longitudinal senior flange and the lateral senior flange when the storage container is in the assembled configuration.

18. The method of claim 15, wherein the junior portion comprises:

a base wall section;

first and second longitudinal junior wall sections; and first and second lateral junior wall sections.

19. The method of claim 18, wherein the first and second longitudinal junior wall sections each comprise a base wall longitudinal interface, wherein the base wall longitudinal interface is configured to receive and support the base wall section when the storage container is in the assembled configuration.

20. The method of claim 18, wherein the first and second lateral junior wall sections each comprise a base edge interface, wherein the base edge interface is configured to receive and support the base wall section when the storage container is in the assembled configuration.

* * * * *